US011480348B2

(12) United States Patent
Nakano et al.

(10) Patent No.: US 11,480,348 B2
(45) Date of Patent: Oct. 25, 2022

(54) HEAT EXCHANGER

(71) Applicant: DAIKIN INDUSTRIES, LTD., Osaka (JP)

(72) Inventors: Hiroyuki Nakano, Osaka (JP); Yasuhiro Sasai, Osaka (JP); Hiroharu Kubo, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 535 days.

(21) Appl. No.: 16/341,783

(22) PCT Filed: Oct. 10, 2017

(86) PCT No.: PCT/JP2017/036650
§ 371 (c)(1),
(2) Date: Apr. 12, 2019

(87) PCT Pub. No.: WO2018/070375
PCT Pub. Date: Apr. 19, 2018

(65) Prior Publication Data
US 2021/0270473 A1 Sep. 2, 2021

(30) Foreign Application Priority Data
Oct. 13, 2016 (JP) ................. 2016-201888

(51) Int. Cl.
*F24F 1/16* (2011.01)
*F24F 1/10* (2011.01)
*F24F 1/34* (2011.01)

(52) U.S. Cl.
CPC ................. *F24F 1/16* (2013.01); *F24F 1/10* (2013.01); *F24F 1/34* (2013.01)

(58) Field of Classification Search
CPC ... F28F 9/10; F28F 9/013; F28F 9/002; F28D 2021/0068; F28D 2021/007;
(Continued)

(56) References Cited

U.S. PATENT DOCUMENTS

| 5,205,349 A | 4/1993 | Nagao et al. | |
| 5,775,119 A * | 7/1998 | Yamada | F24F 1/06 62/259.1 |
| 2014/0360222 A1 | 12/2014 | Masui | |

FOREIGN PATENT DOCUMENTS

| EP | 1413845 A1 | 4/2004 |
| JP | H04-288488 A | 10/1992 |

(Continued)

OTHER PUBLICATIONS

JP-2000161892-A English Translation (Year: 2000).*
(Continued)

*Primary Examiner* — Schyler S Sanks
(74) *Attorney, Agent, or Firm* — Osha Bergman Watanabe & Burton LLP

(57) ABSTRACT

A heat exchanger includes: a main body; and a tube sheet that is bonded to the main body with a brazing material and is used to fix the main body to a support by a fixing member. The tube sheet includes: a bonding surface to which the brazing material is applied; a rising portion that rises from the bonding surface; and a through-hole through which the fixing member is passed. The through-hole is opened at the rising portion, penetrates the tube sheet, and has an inner peripheral surface to which the brazing material is not applied. The main body includes heat transfer tubes through which refrigerant flows, and the tube sheet is bonded to surface of the heat transfer tube.

5 Claims, 15 Drawing Sheets

(58) Field of Classification Search
CPC ...... F28D 2021/0071; F28D 3/04; F28D 3/02; F25B 39/02; F25B 39/04; F24F 1/34; F24F 1/16; F24F 1/10
See application file for complete search history.

(56) References Cited

FOREIGN PATENT DOCUMENTS

| JP | H04-288489 A | | 10/1992 | |
|---|---|---|---|---|
| JP | H8-285329 A | | 11/1996 | |
| JP | H11-23184 A | | 1/1999 | |
| JP | 2000-161892 A | | 6/2000 | |
| JP | 2000161892 A | * | 6/2000 | ............ F28F 9/0243 |
| JP | 2001-121257 A | | 5/2001 | |
| JP | 2010-107103 A | | 5/2010 | |
| JP | 2011-169535 A | | 9/2011 | |

OTHER PUBLICATIONS

International Search Report issued in corresponding International Application No. PCT/JP2017/036650 dated Dec. 12, 2017 (5 pages).
Written Opinion of the International Searching Authority issued in corresponding International Application No. PCT/JP2017/036650 dated Dec. 12, 2017 (5 pages).
Office Action issued in corresponding Japanese Patent Application No. 2017-195624 dated Dec. 5, 2017 (7 pages).
Notification of Transmittal of Copies of Translation of the International Preliminary Report of Patentability issued in corresponding International Application No. PCT/JP2017/036650, dated Apr. 25, 2019 (1 page).
International Preliminary Report on Patentability issued in corresponding International Application No. PCT/JP2017/036650, dated Apr. 16, 2019 (9 pages).
Extended European Search Report issued in corresponding European Application No. 17860606.7 dated Sep. 9, 2019 (9 pages).

* cited by examiner

HEAT EXCHANGER

TECHNICAL FIELD

The present invention relates to a heat exchanger and an outdoor unit for a refrigeration apparatus including the heat exchanger.

BACKGROUND

Hitherto, an outdoor unit including a microchannel heat exchanger such as disclosed in Patent Literature 1 (Japanese Unexamined Patent Application Publication No. 2010-107103) has been used as an outdoor unit for an air conditioner that is one type of refrigeration apparatus. The outdoor unit mainly includes a casing, a partition plate, the microchannel heat exchanger, a fan, a compressor, and an electric component box. The partition plate partitions an inner space of the casing into a heat exchanger chamber and a machine chamber. The microchannel heat exchanger and the fan are disposed in the heat exchanger chamber. The compressor and the electric component box are disposed in the machine chamber. The electric component box is a case in which a circuit board, etc. for controlling the fan and the compressor are disposed. The microchannel heat exchanger performs heat exchange between a refrigerant compressed by the compressor and air supplied by the fan.

The microchannel heat exchanger is mainly constituted so far by perforated tubes, a header, and heat transfer fins. The perforated tubes are each a flat tube having a plurality of arrayed through-holes through which the refrigerant passes. The header is a pipe to which end portions of the perforated tubes are connected. In other words, the header is a pipe through which the refrigerant flowing into the through-holes of the perforated tubes or the refrigerant flowing out of the through-holes of the perforated tubes flows. The heat transfer fins are attached to surfaces of the perforated tubes.

The microchannel heat exchanger is a heat exchanger in which the perforated tubes and the heat transfer fins are alternately stacked, and it performs heat exchange between the refrigerant flowing through the perforated tubes and air passing the heat transfer fins. Both end portions of the microchannel heat exchanger are supported by a pair of tube sheets. The pair of tube sheets are fixed to the casing of the outdoor unit and are in contact with both ends of the stacked heat transfer fins. The perforated tubes penetrate the tube sheets and are bonded to the tube sheets by brazing, for example.

In the above-described microchannel heat exchanger, a brazing material used for bonding is applied to a surface of the tube sheet on the side bonded to the perforated tubes, and screw holes through which screws for fixing the tube sheet to the casing of the outdoor unit pass are opened in that surface of the tube sheet in some cases. When bonding the tube sheet to the perforated tubes by brazing, however, if the melted brazing material enters the screw holes, there is a possibility that the screw holes are deformed due to heat. The deformation of the screw holes may lead to a possibility that the tube sheet cannot be normally screwed to the casing and the microchannel heat exchanger cannot be normally fixed to the casing.

SUMMARY

One or more embodiments of the present invention provide a heat exchanger capable of suppressing occurrence of a trouble that a main body of the heat exchanger cannot be normally fixed, and an outdoor unit for a refrigeration apparatus including the heat exchanger.

A heat exchanger according to one or more embodiments of the present invention includes a main body of the heat exchanger and a supported member. The supported member is bonded to the main body of the heat exchanger with a brazing material, and is used to fix the main body of the heat exchanger to a support by a fixing member (i.e., fastener). The supported member includes a bonding surface to which the brazing material is applied, a rising portion rising from the bonding surface, and a through-hole through which the fixing member is passed. The through-hole is opened at the rising portion, penetrates the supported member, and has an inner peripheral surface to which the brazing material is not applied.

In the heat exchanger according to one or more embodiments, the supported member used to fix the main body of the heat exchanger includes the through-hole through which the fixing member, such as a screw, is passed. The rising portion corresponding to, for example, a barring flange of the through-hole is formed on the bonding surface to which the brazing material is applied. Therefore, when the supported member and the main body of the heat exchanger are bonded to each other by brazing, the rising portion prevents the melted brazing material from coming into the through-hole. As a result, deformation of the through-hole, which may be caused by the melted brazing material coming into the through-hole, is suppressed. Furthermore, a fillet of the melted brazing material is formed around the rising portion due to surface tension of the melted brazing material. Because the fillet reinforces the rising portion, the through-hole is suppressed from being deformed due to forces applied from the outside. If the through-hole is deformed, there is a possibility that the main body of the heat exchanger cannot be normally fixed to the support such as a casing. Thus, the heat exchanger according to one or more embodiments can suppress a trouble that the main body of the heat exchanger cannot be normally fixed.

According to one or more embodiments of the present invention, the supported member includes the bonding surface on which a layer of an aluminum brazing material serving as the brazing material is formed.

In the heat exchanger according to one or more embodiments, the supported member is formed of, for example, an aluminum-clad member including a layer of an aluminum brazing material. Therefore, the heat exchanger according to one or more embodiments can facilitate the brazing between the supported member and the main body of the heat exchanger.

According to one or more embodiments of the present invention, the supported member is bonded to the main body of the heat exchanger by furnace brazing.

In the heat exchanger according to one or more embodiments, the supported member and the main body of the heat exchanger are braze-bonded to each other by furnace brazing. Therefore, the heat exchanger according to one or more embodiments can efficiently perform the brazing between the supported member and the main body of the heat exchanger.

According to one or more embodiments of the present invention, the main body of the heat exchanger includes heat transfer tubes through which a refrigerant flows, and the supported member is bonded to surfaces of the heat transfer tubes.

In the heat exchanger according to one or more embodiments, the supported member is bonded to surfaces of the heat transfer tubes in the main body of the heat exchanger by brazing. Therefore, the heat exchanger according to one or more embodiments can easily bond the supported member to the main body of the heat exchanger.

According to one or more embodiments of the present invention, the supported member includes a bent portion demarcating the bonding surface into a first bonding surface and a second bonding surface, and is bonded at the first bonding surface to the main body of the heat exchanger. The rising portion rises from the second bonding surface.

In the heat exchanger according to one or more embodiments, the supported member has an L-shape. Therefore, the heat exchanger according to one or more embodiments can improve workability of the supported member.

An outdoor unit for a refrigeration apparatus according to one or more embodiments of the present invention includes the heat exchanger according to one or more embodiments, a compressor, and a support to which the heat exchanger and the compressor are fixed. The support is at least one of a casing and a partition plate. The casing stores the heat exchanger and the compressor. The partition plate partitions an inner space of the casing into a heat exchanger chamber in which the heat exchanger is disposed, and a machine chamber in which the compressor is disposed.

The outdoor unit for the refrigeration apparatus according to one or more embodiments can suppress the occurrence of a trouble that the main body of the heat exchanger cannot be normally fixed. Therefore, the outdoor unit for the refrigeration apparatus according to one or more embodiments can suppress the occurrence of a trouble that the heat exchanger is detached from the casing.

The heat exchanger according to one or more embodiments of the present invention and the outdoor unit for the refrigeration apparatus including the heat exchanger can suppress the occurrence of the trouble that the main body of the heat exchanger cannot be normally fixed.

DETAILED DESCRIPTION

A heat exchanger according to one or more embodiments of the present invention and an outdoor unit for a refrigeration apparatus including the heat exchanger will be described below with reference to the drawings. The heat exchanger according to one or more embodiments is a microchannel heat exchanger included in the outdoor unit for the refrigeration apparatus such as an air conditioner.

(1) Structure of Outdoor Unit

Figure 1:
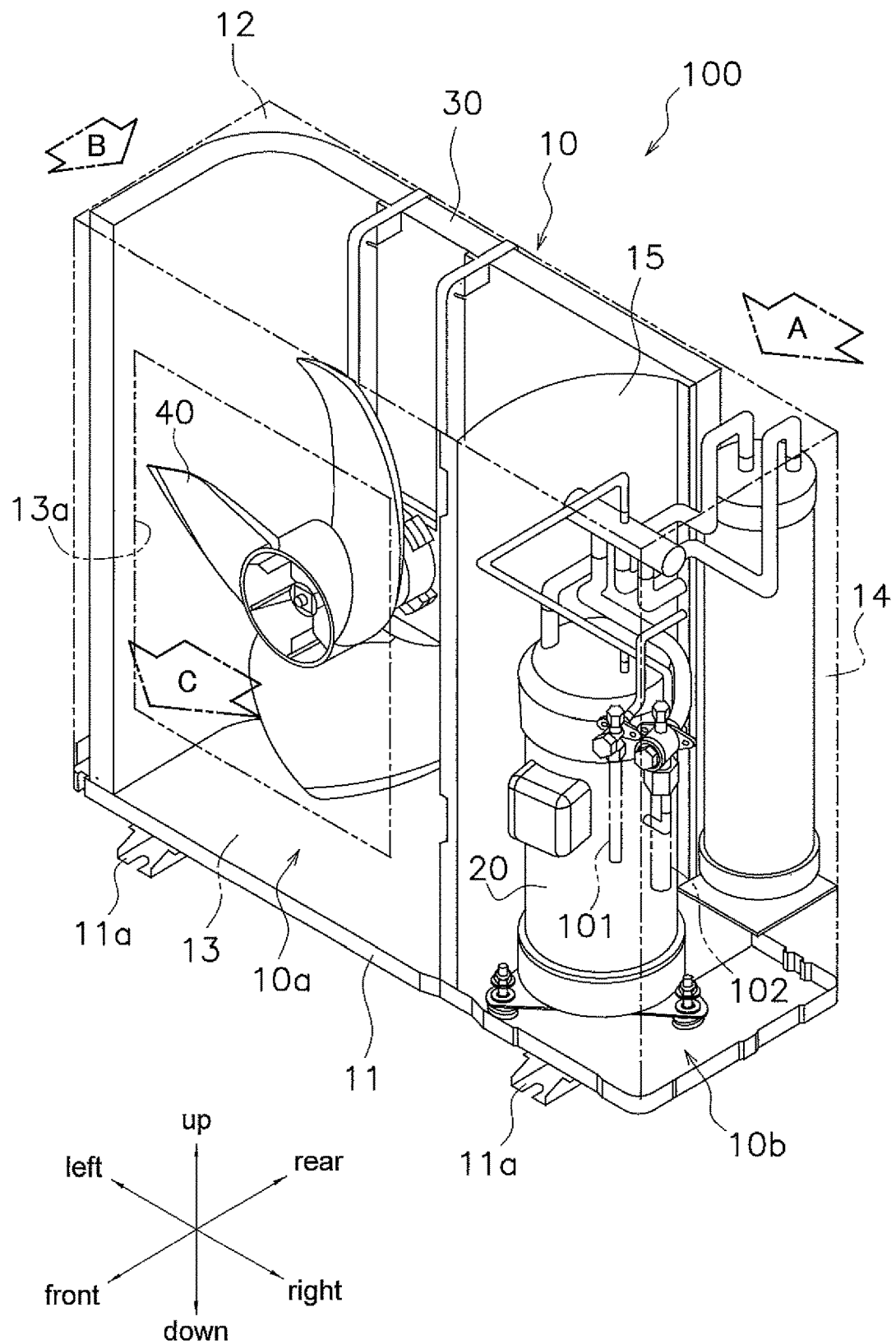
FIG. 1 is a perspective view illustrating an internal structure of an outdoor unit 100 including a heat exchanger 30 according to one or more embodiments.

FIG. 1 is a perspective view illustrating an internal structure of an outdoor unit 100 including a heat exchanger 30 according to one or more embodiments. The outdoor unit 100 is a component of an air conditioner including a refrigeration cycle that uses a refrigerant circulating in a refrigeration circuit. The outdoor unit 100 is connected to an indoor unit (not illustrated) through external pipes 101 and 102. In the following description, six directions expressed by "front", "rear", "up", "down", "left", and "right" are defined as illustrated in FIG. 1. In FIG. 1, a vertical direction is aligned with an up-down direction.

The outdoor unit 100 mainly includes a casing 10 having a substantially rectangular parallelepiped shape, a compressor 20, the heat exchanger 30, and a fan 40. The outdoor unit 100 further includes various devices, valves, refrigerant pipes, etc. in addition to the above-mentioned components.

(1-1) Casing

The casing 10 mainly includes a bottom panel 11, a top panel 12, a front panel 13, a side panel 14, and a partition plate 15. In FIG. 1, the top panel 12, the front panel 13, and the side panel 14 are illustrated by two-dot-chain lines.

The bottom panel 11 is a substantially rectangular plate-like member constituting a lower surface of the casing 10. A peripheral edge of the bottom panel 11 is bent upward. A plurality of fixation legs 11a is attached to an outer peripheral portion of the bottom panel 11. The fixation legs 11a extend from the front side toward the rear side of the casing 10. The fixation legs 11a are members used to fix the outdoor unit 100 to an installation surface.

The top panel 12 is a substantially rectangular plate-like member constituting an upper surface of the casing 10. The top panel 12 is opposed to the bottom panel 11.

The front panel 13 is a plate-like member mainly constituting a front surface of the casing 10 and a front portion of a right surface of the casing 10. A lower portion of the front panel 13 is fixed to the bottom panel 11 by screws, for example. A blowout opening 13a is formed in the front panel 13. The blowout opening 13a is an opening through which outdoor air taken into the casing 10 from the outside is blown out to the outside of the casing 10. In FIG. 1, flows of air passing through the casing 10 are denoted by arrows A to C.

The side panel 14 is a plate-like member mainly constituting a rear portion of the right surface of the casing 10 and a right portion of a rear surface of the casing 10. A lower portion of the side panel 14 is fixed to the bottom panel 11 by screws, for example.

The partition plate 15 is a plate-like member fixed to the bottom panel 11. The partition plate 15 extends in the vertical direction. A lower portion of the partition plate 15 is fixed to the bottom panel 11 by screws, for example. The partition plate 15 partitions an inner space of the casing 10 into two chambers, i.e., a heat exchanger chamber 10a and a machine chamber 10b. The heat exchanger chamber 10a is a space occupying the left side of the inner space of the casing 10. The machine chamber 10b is a space occupying the right side of the inner space of the casing 10. The space of the heat exchanger chamber 10a is surrounded by the bottom panel 11, the top panel 12, the front panel 13, and the partition plate 15. The space of the machine chamber 10b is surrounded by the bottom panel 11, the top panel 12, the front panel 13, the side panel 14, and the partition plate 15. The heat exchanger 30 and the fan 40 are mainly disposed in the heat exchanger chamber 10a. The compressor 20 is mainly disposed in the machine chamber 10b.

(1-2) Compressor

The compressor 20 compresses the refrigerant under low pressure to the refrigerant under high pressure in the refrigeration cycle. The compressor 20 is a hermetic compressor having a substantially cylindrical shape. The compressor 20 is disposed in a central region of the machine chamber 10b when viewing the outdoor unit 100 along the vertical direction.

(1-3) Heat Exchanger

The heat exchanger 30 performs heat exchange between the refrigerant circulating in the refrigeration cycle and outdoor air. When the air conditioner is in a cooling operation mode, the heat exchanger 30 functions as a radiator for the refrigerant, and when the air conditioner is in a heating operation mode, it functions as a heat absorber for the refrigerant. The heat exchanger 30 is a fin-and-tube heat exchanger including a plurality of heat transfer tubes 31 to 34 and heat transfer fins 35. The heat exchanger 30 has a substantially L-shape when viewed along the vertical direction. The heat exchanger 30 is disposed in the heat exchanger chamber 10a along the left side and the rear side of the casing 10. The heat exchanger 30 is disposed over a region surrounding both the left side and the rear side of the fan 40.

(1-4) Fan

The fan 40 takes the outdoor air into the heat exchanger chamber 10a through inlets (not illustrated) that are formed in the left side and the rear side of the casing 10, and blows out the air having passed through the heat exchanger 30 from the blowout opening 13a. The fan 40 is a propeller fan, for example. The fan 40 is disposed in the heat exchanger chamber 10a. The fan 40 is disposed downstream of the heat exchanger 30 with respect to the flows of the air, denoted by arrows A to C in FIG. 1, passing through the casing 10.

(2) Detailed Structure of Heat Exchanger

Figure 2:
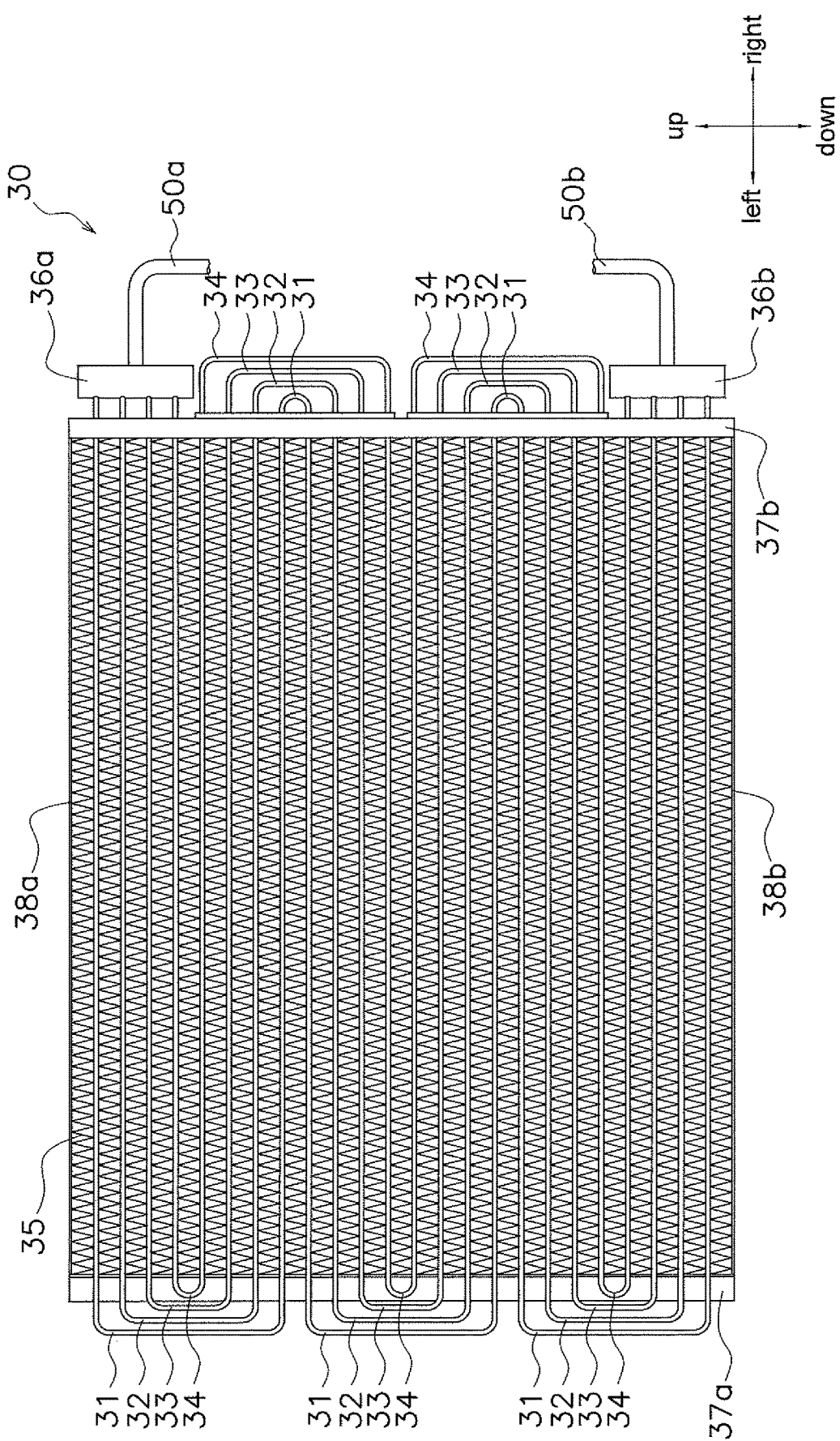
FIG. 2 is a schematic view of the heat exchanger 30 according to one or more embodiments.

FIG. 2 is a schematic view of the heat exchanger 30. FIG. 2 represents the heat exchanger 30 having a flat-plate shape in a state before it is bent into the substantially L-shape illustrated in FIG. 1. In FIG. 2, four directions "up", "down", "left", and "right" are denoted by four arrows, respectively. In FIG. 2, a vertical direction is aligned with an up-down direction. The upper side in FIG. 2 corresponds to the upper side in FIG. 1. The lower side in FIG. 2 corresponds to the lower side in FIG. 1. In FIG. 2, both end portions of the heat exchanger 30 in a left-right direction correspond to both end portions of the heat exchanger 30 in a lengthwise direction when viewing the outdoor unit 100 illustrated in FIG. 1 along the vertical direction. More specifically, a left end portion of the heat exchanger 30 illustrated in FIG. 2 corresponds to an end portion of the heat exchanger 30 on the front side when viewed in FIG. 1, and a right end portion of the heat exchanger 30 illustrated in FIG. 2 corresponds to an end portion of the heat exchanger 30 on the rear side when viewed in FIG. 1.

The heat exchanger 30 mainly includes four heat transfer tubes 31 to 34, many heat transfer fins 35, two inlet-outlet pipes 36a and 36b, and two tube sheets 37a and 37b. In the following, as required, the heat transfer tubes 31 to 34 are called a first heat transfer tube 31, a second heat transfer tube 32, a third heat transfer tube 33, and a fourth heat transfer tube 34, respectively. The inlet-outlet pipes 36a and 36b are called a first inlet-outlet pipe 36a and a second inlet-outlet pipe 36b, respectively. The tube sheets 37a and 37b are called a left-side tube sheet 37a and a right-side tube sheet 37b respectively.

(2-1) Heat Transfer Tube

The heat transfer tubes 31 to 34 are each a flat perforated tube made of aluminum or an aluminum alloy. The flat perforated tube is a flat tube having a plurality of through-holes arrayed in a predetermined direction. The through-holes of the flat perforated tube penetrate the flat perforated tube in a lengthwise direction. The flat perforated tube is manufactured by injection molding, for example. The through-holes of the heat transfer tubes 31 to 34 are holes through which the refrigerant undergoing heat exchange in the heat exchanger 30 passes.

Figure 3:
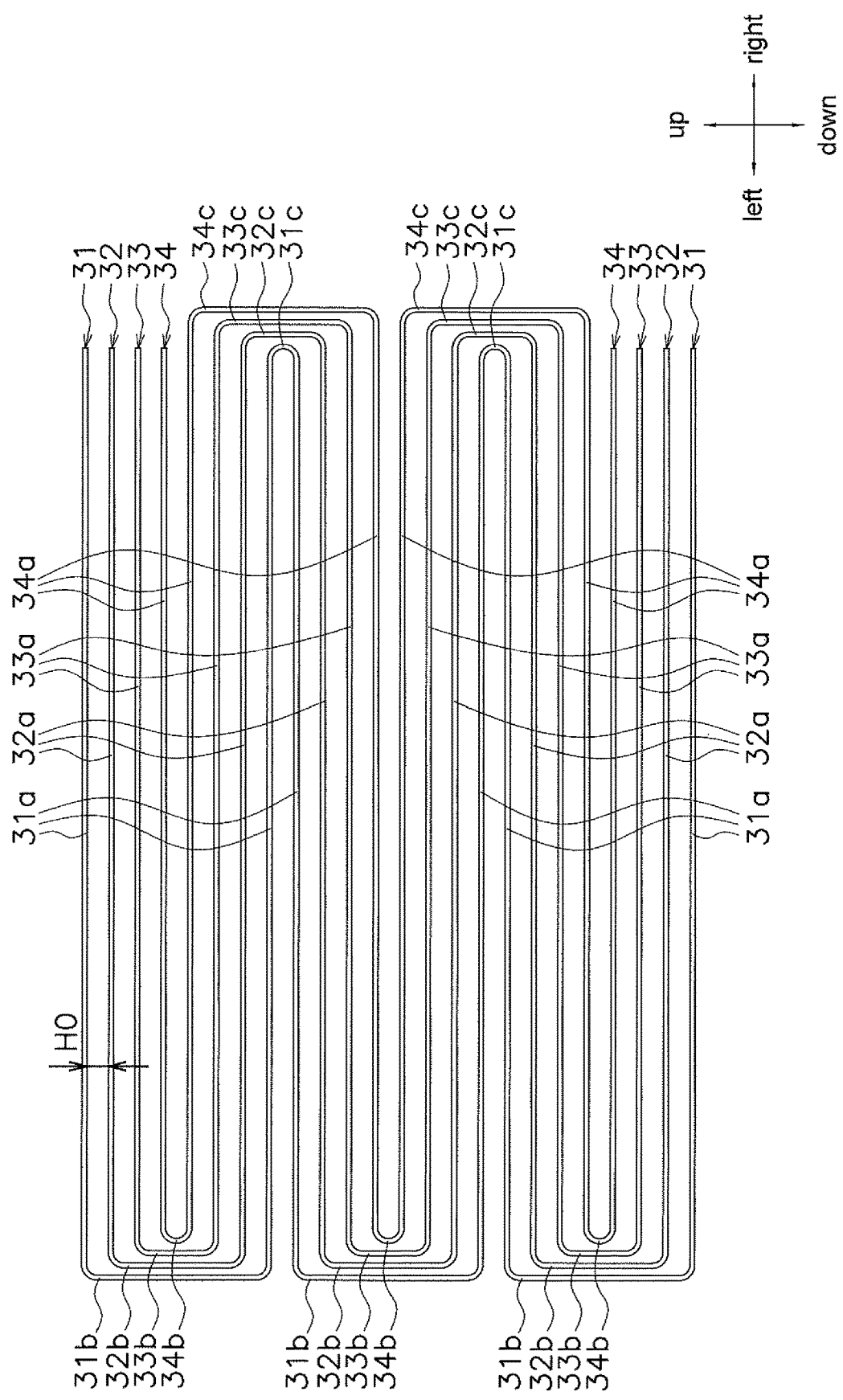
FIG. 3 illustrates only heat transfer tubes 31 to 34 in FIG. 2.

The heat transfer tubes 31 to 34 are each the flat perforated tube meandering in the vertical direction. The heat transfer tubes 31 to 34 have shapes different from another. FIG. 3 illustrates only the heat transfer tubes 31 to 34 in FIG. 2. In FIG. 3, four directions "up", "down", "left", and "right" are denoted by four arrows, respectively. The upper side in FIG. 3 corresponds to the upper side in FIG. 2. The lower side in FIG. 3 corresponds to the lower side in FIG. 2. The left side in FIG. 3 corresponds to the left side in FIG. 2. The right side in FIG. 3 corresponds to the right side in FIG. 2.

As illustrated in FIG. 3, the first heat transfer tube 31 is constituted by a horizontal portion 31a, a first bent portion 31b, and a second bent portion 31c. The horizontal portion 31a, the first bent portion 31b, and the second bent portion 31c are each part of the first heat transfer tube 31 in the lengthwise direction thereof. In FIG. 3, the first heat transfer tube 31 includes six horizontal portions 31a, three first bent portion 31b, and two second bent portions 31c. The first bent portion 31b and the second bent portion 31c are each part between two horizontal portions 31a. Both end portions of the first heat transfer tube 31 are the horizontal portions 31a. Two horizontal portions 31a at both the end portions of the first heat transfer tube 31 are each connected to one first bent portion 31b. Four horizontal portions 31a except for the horizontal portions 31a at both the end portions of the first heat transfer tube 31 are each connected to one first bent portion 31b and one second bent portion 31c.

The horizontal portion 31a is part extending in a horizontal direction perpendicular to the vertical direction. In the horizontal portion 31a, the through-holes are arrayed along a direction orthogonal to both the lengthwise direction and the vertical direction. Hereinafter, the direction in which the through-holes are arrayed in the horizontal portion 31a is called a width direction. In FIG. 3, the width direction is a direction orthogonal to both the up-down direction and the left-right direction. Six horizontal portions 31a of the first heat transfer tube 31 are arranged at predetermined intervals in the vertical direction. Each of the horizontal portions 31a has a substantially L-shape when viewing the heat exchanger 30, illustrated in FIG. 1, along the vertical direction.

The first bent portion 31b is part where the first heat transfer tube 31 is bent. Two horizontal portions 31a on both the sides of the first bent portion 31b are parallel to each other. The second bent portion 31c is part where the first heat transfer tube 31 is bent. Two horizontal portions 31a on both the sides of the second bent portion 31c are parallel to each other. The second bent portion 31c is bent in an opposite direction to the first bent portion 31b. Thus, the first heat transfer tube 31 is meandered while it is bent at the first bent portion 31b and the second bent portion 31c. As illustrated in FIG. 3, the second heat transfer tube 32, the third heat transfer tube 33, and the fourth heat transfer tube 34 are also meandered while they are bent similarly to the first heat transfer tube 31.

The second heat transfer tube 32 includes six horizontal portions 32a, three first bent portion 32b, and two second bent portions 32c. The second heat transfer tube 32 is bent in the first bent portion 32b and the second bent portion 32c. The second bent portion 32c is bent in an opposite direction to the first bent portion 32b.

The third heat transfer tube 33 includes six horizontal portions 33a, three first bent portion 33b, and two second bent portions 33c. The third heat transfer tube 33 is bent in the first bent portion 33b and the second bent portion 33c. The second bent portion 33c is bent in an opposite direction to the first bent portion 33b.

The fourth heat transfer tube 34 includes six horizontal portions 34a, three first bent portion 34b, and two second bent portions 34c. The fourth heat transfer tube 34 is bent in the first bent portion 34b and the second bent portion 34c. The second bent portion 34c is bent in an opposite direction to the first bent portion 34b.

As illustrated in FIG. 3, the heat transfer tubes 31 to 34 are disposed in a state of not contacting with each other. The horizontal portions 31a to 34a of the heat transfer tubes 31 to 34 are arranged at regular intervals in the vertical direction.

(2-2) Heat Transfer Fin

The heat transfer fins 35 are disposed in contact with surfaces of the horizontal portions 31a to 34a of the heat transfer tubes 31 to 34. More specifically, the heat transfer fins 35 are in contact with the surfaces of the horizontal portions 31a to 34a on at least one of the upper side and the lower side. The heat transfer fins 35 are each disposed between two of the horizontal portions 31a to 34a adjacent to each other in the vertical direction.

In FIG. 2, an upper-side frame panel 38a is disposed above the horizontal portion 31a at the uppermost position. The upper-side frame panel 38a is an elongate panel disposed parallel to the horizontal portions 31a. The heat transfer fin 35 is disposed between the horizontal portion 31a at the uppermost position and the upper-side frame panel 38a. Similarly, a lower-side frame panel 38b is disposed under the horizontal portion 31a at the lowermost position. The lower-side frame panel 38b is an elongate panel disposed parallel to the horizontal portions 31a. The heat transfer fin 35 is disposed between the horizontal portion 31a at the lowermost position and the lower-side frame panel 38b.

Figure 4:
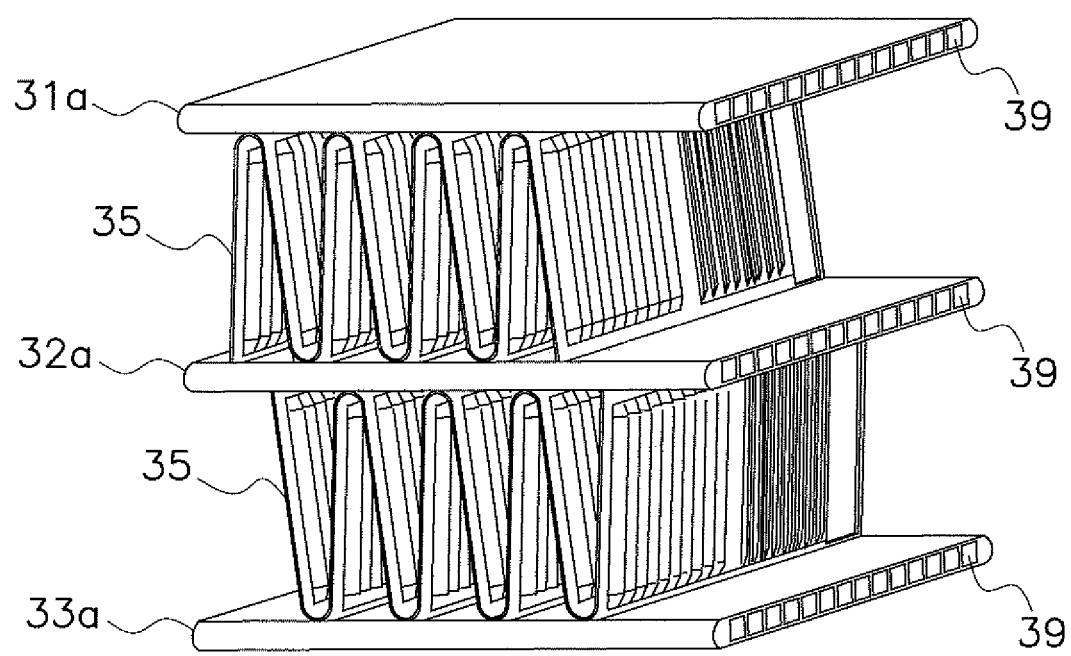
FIG. 4 is an external view of heat transfer fins 35 that are corrugated fins according to one or more embodiments.

The heat transfers fins 35 are each a corrugated fin made of aluminum or an aluminum alloy. FIG. 4 is an external view of the heat transfer fins 35 that are the corrugated fins. FIG. 4 illustrates the heat transfer fin 35 positioned between the horizontal portion 31a of the first heat transfer tube 31 and the horizontal portion 32a of the second heat transfer tube 32, and the heat transfer fin 35 positioned between the horizontal portion 32a of the second heat transfer tube 32 and the horizontal portion 33a of the third heat transfer tube 33. FIG. 4 further illustrates cross-sections of the horizontal portions 31a to 33a of the heat transfer tubes 31 to 33, including through-holes 39 formed in the horizontal portions 31a to 33a. The through-holes 39 are arrayed along the width direction of the horizontal portions 31a to 33a.

The heat transfer fins 35 are formed by bending plate-like materials into a corrugated shape along the lengthwise direction of the horizontal portions 31a to 34a. A size of the heat transfer fins 35 in the width direction is greater than that of at least the horizontal portions 31a to 34a in the width direction.

The heat transfer fins 35 guide the outdoor air undergoing heat transfer with the refrigerant that flows in the through-holes 39 in the horizontal portions 31a to 34a of the heat transfer tubes 31 to 34. The outdoor air passing the heat transfer fins 35 flows in the width direction of the horizontal portions 31a to 34a.

(2-3) Inlet-Outlet Pipe

As illustrated in FIG. 2, the inlet-outlet pipes 36a and 36b are attached to both the end portions of the heat transfer tubes 31 to 34. The inlet-outlet pipes 36a and 36b are disposed along the vertical direction. The first inlet-outlet pipe 36a is attached to upper end portions of the heat transfer tubes 31 to 34. The second inlet-outlet pipe 36b is attached to lower end portions of the heat transfer tubes 31 to 34. Inner spaces of the inlet-outlet pipes 36a and 36b are in communication with the through-holes 39 of the heat transfer tubes 31 to 34. The first inlet-outlet pipe 36a is connected to a first refrigerant pipe 50a. The second inlet-outlet pipe 36b is connected to a second refrigerant pipe 50b. The first refrigerant pipe 50a and the second refrigerant pipe 50b are pipes in the refrigerant circuit, which are connected to the heat exchanger 30.

The refrigerant flowing in the first refrigerant pipe 50a and being not yet heat-exchanged in the heat exchanger 30 is supplied to the first inlet-outlet pipe 36a and flows into the through-holes 39 of each of the heat transfer tubes 31 to 34. The refrigerant flowing in the through-holes 39 of the heat transfer tubes 31 to 34 is heat-exchanged with the outdoor air passing the heat transfer fins 35. The refrigerant after being heat-exchanged is supplied from the through-holes 39 of each of the heat transfer tubes 31 to 34 to the second inlet-outlet pipe 36b, and flows into the second refrigerant pipe 50b. A flowing direction of the refrigerant may be reversed to the above-described direction. More specifically, the refrigerant flowing in the second refrigerant pipe 50b and being not yet heat-exchanged in the heat exchanger 30 may be supplied to the second inlet-outlet pipe 36b, and the refrigerant after being heat-exchanged in the through-holes 39 of the heat transfer tubes 31 to 34 may be supplied to the first inlet-outlet pipe 36a to flow into the first refrigerant pipe 50a.

(2-4) Tube Sheet

The tube sheets 37a and 37b are members for supporting the heat transfer fins 35. As illustrated in FIG. 2, the tube sheets 37a and 37b are disposed in contact with both the end portions of the heat transfer fins 35 in the lengthwise direction.

The tube sheets 37a and 37b are each an elongate sheet extending in the vertical direction. The tube sheets 37a and 37b have openings or cutouts through which the heat transfer tubes 31 to 34 pass. The tube sheets 37a and 37b are brazed to the heat transfer tubes 31 to 34. The tube sheets 37a and 37b are fixed to the casing 10 and the partition plate 15 of the outdoor unit 100 by screwing.

The left-side tube sheet 37a is attached to the left end portion of the heat exchanger 30 illustrated in FIG. 2. The right-side tube sheet 37b is attached to the right end portion of the heat exchanger 30 illustrated in FIG. 2. The upper-side frame panel 38a is fixed to an upper end portion of the left-side tube sheet 37a and an upper end portion of the right-side tube sheet 37b by brazing, for example. The lower-side frame panel 38b is fixed to a lower end portion of the left-side tube sheet 37a and a lower end portion of the right-side tube sheet 37b by welding, for example.

Both the end portions of the heat transfer tubes 31 to 34 pass through the openings or the cutouts in the right-side tube sheet 37b. The right-side tube sheet 37b is positioned between the heat transfer fins 35 and the inlet-outlet pipes 36a and 36b in a direction in which the heat transfer tubes 31 to 34 extend.

The left-side tube sheet 37a and the right-side tube sheet 37b will be described below one by one.

(2-4-1) Left-Side Tube Sheet

Figure 5:
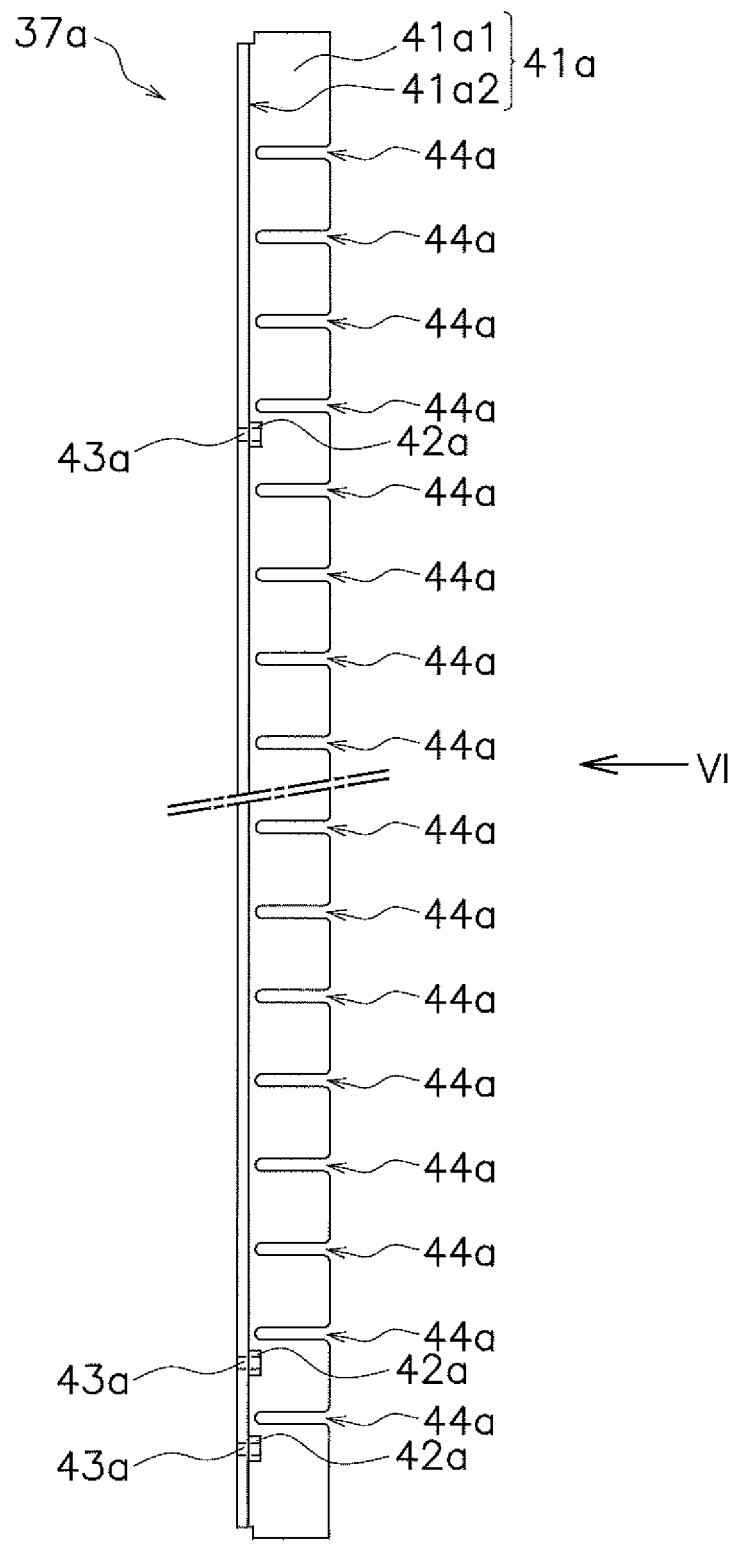
FIG. 5 illustrates a left-side tube sheet 37a when viewed from the left side toward the right side in FIG. 2.
Figure 6:
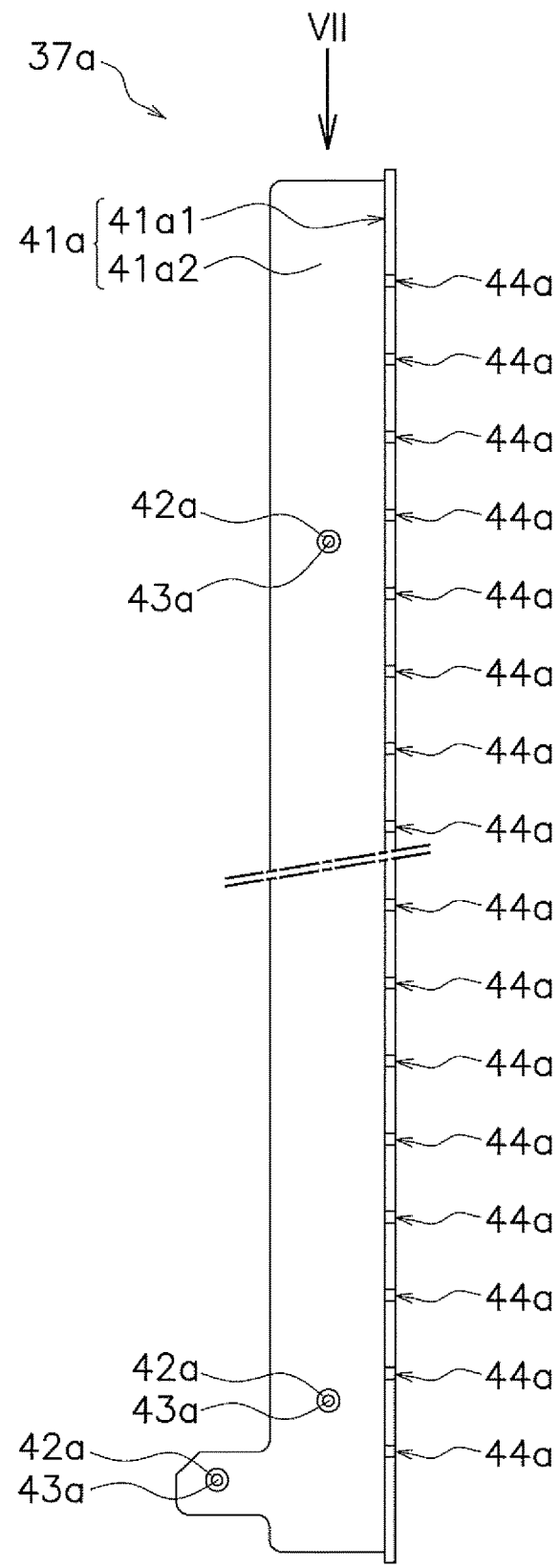
FIG. 6 illustrates the left-side tube sheet 37a when viewed in a direction denoted by arrow VI in FIG. 5.
Figure 7:
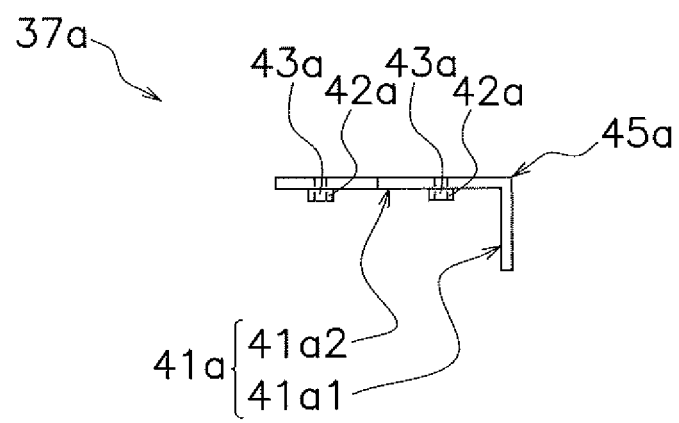
FIG. 7 illustrates the left-side tube sheet 37a when viewed in a direction denoted by arrow VII in FIG. 6.

FIG. 5 illustrates the left-side tube sheet 37a when viewed from the left side toward the right side in FIG. 2. FIG. 6 illustrates the left-side tube sheet 37a when viewed in a direction denoted by arrow VI in FIG. 5. FIG. 7 illustrates the left-side tube sheet 37a when viewed in a direction denoted by arrow VII in FIG. 6. FIG. 7 corresponds to an illustration representing the left-side tube sheet 37a when viewed from the upper side toward the lower side in FIG. 2.

The left-side tube sheet 37a mainly includes a left-side bonding surface 41a, left-side rising portions 42a, left-side through-holes 43a, and left-side cutouts 44a. As illustrated in FIG. 7, the left-side tube sheet 37a is bent at a right angle in one left-side bent portion 45a and has an L-shape when viewed along the vertical direction. The left-side bonding surface 41a is an inner principal surface of the left-side tube sheet 37a. The left-side bonding surface 41a is an aluminum-clad surface on which a layer of an aluminum brazing material is formed. The left-side bonding surface 41a is constituted by a left-side first bonding surface (area) 41a1 and a left-side second bonding surface (area) 41a2. The left-side bent portion 45a demarcates the left-side first bonding surface 41a1 and the left-side second bonding surface 41a2.

As illustrated in FIG. 5, the left-side first bonding surface 41a1 has many left-side cutouts 44a. The number of left-side cutouts 44a is the same as that of the horizontal portions 31a to 34a of the heat transfer tubes 31 to 34. In manufacturing of the heat exchanger 30, the horizontal portions 31a to 34a are inserted through the left-side cutouts 44a along the width direction. The aluminum brazing material on the left-side bonding surface 41a is used to braze the left-side tube sheet 37a and the heat transfer tubes 31 to 34.

As illustrated in FIG. 6, the left-side second bonding surface 41a2 includes the left-side rising portions 42a and the left-side through-holes 43a. The left-side rising portions 42a rise from the left-side second bonding surface 41a2. The left-side through-holes 43a are formed in the left-side second bonding surface 41a2. The left-side through-holes 43a are opened through the left-side rising portions 42a from the left-side second bonding surface 41a2. The left-side rising portions 42a correspond to barring flanges formed when the left-side through-holes 43a are bored in the left-side second bonding surface 41a2. The left-side through-holes 43a are holes through which tube-sheet fixing screws are to be passed. Layers of aluminum brazing materials are not formed inside the left-side through-holes 43a, i.e., on inner peripheral surfaces of the left-side through-holes 43a. The tube-sheet fixing screws are fixing members used to fix the left-side tube sheet 37a to the casing 10.

(2-4-2) Right-Side Tube Sheet

Figure 8:
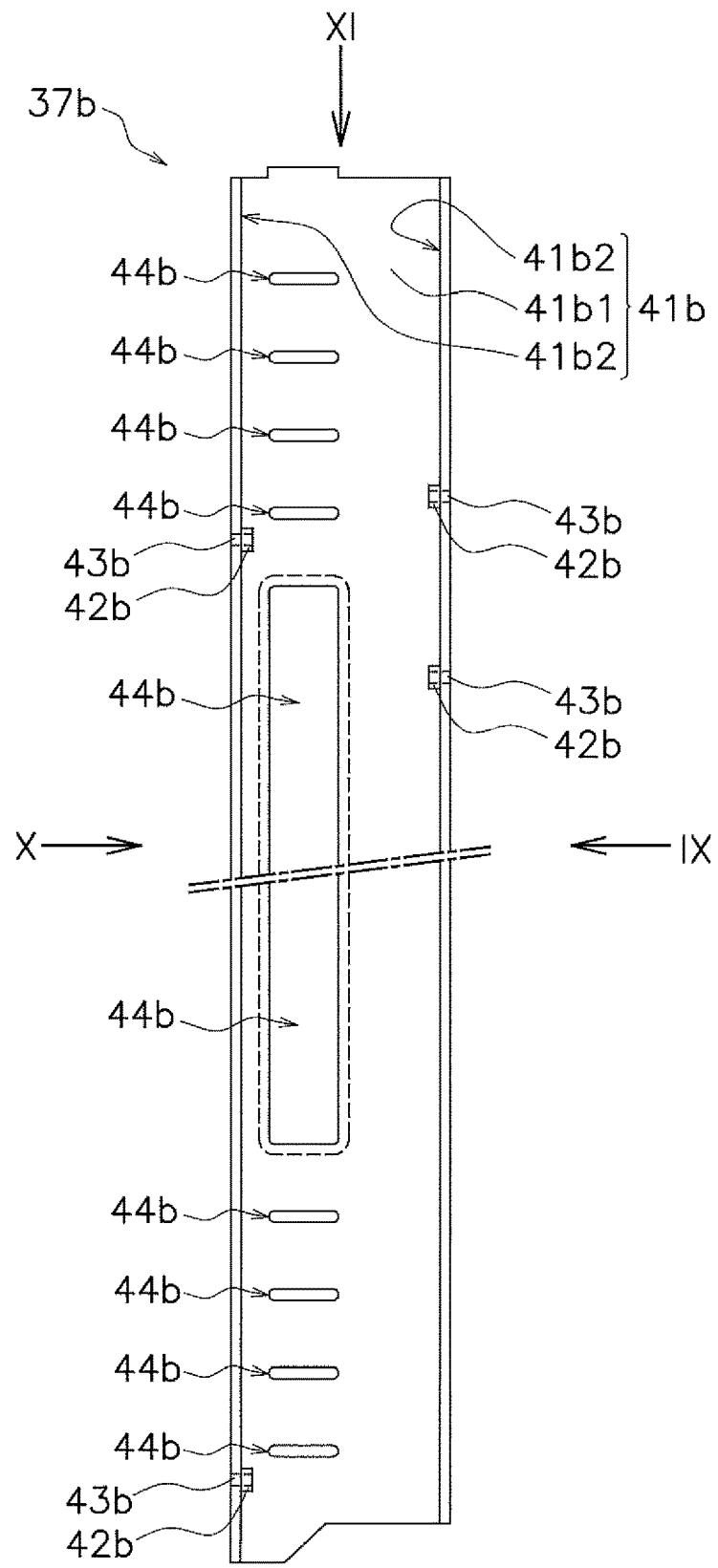
FIG. 8 illustrates a right-side tube sheet 37b when viewed from the left side toward the right side in FIG. 2.
Figure 9:
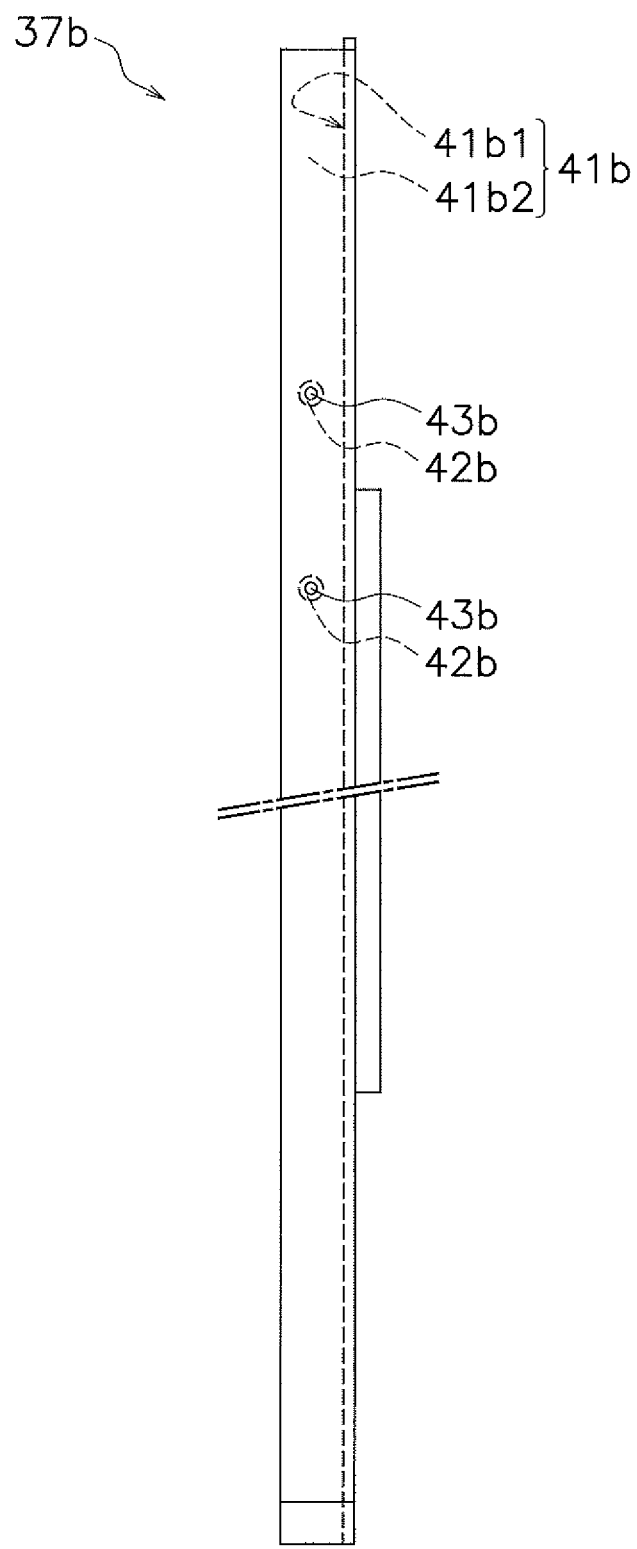
FIG. 9 illustrates the right-side tube sheet 37b when viewed in a direction denoted by arrow IX in FIG. 8.
Figure 10:
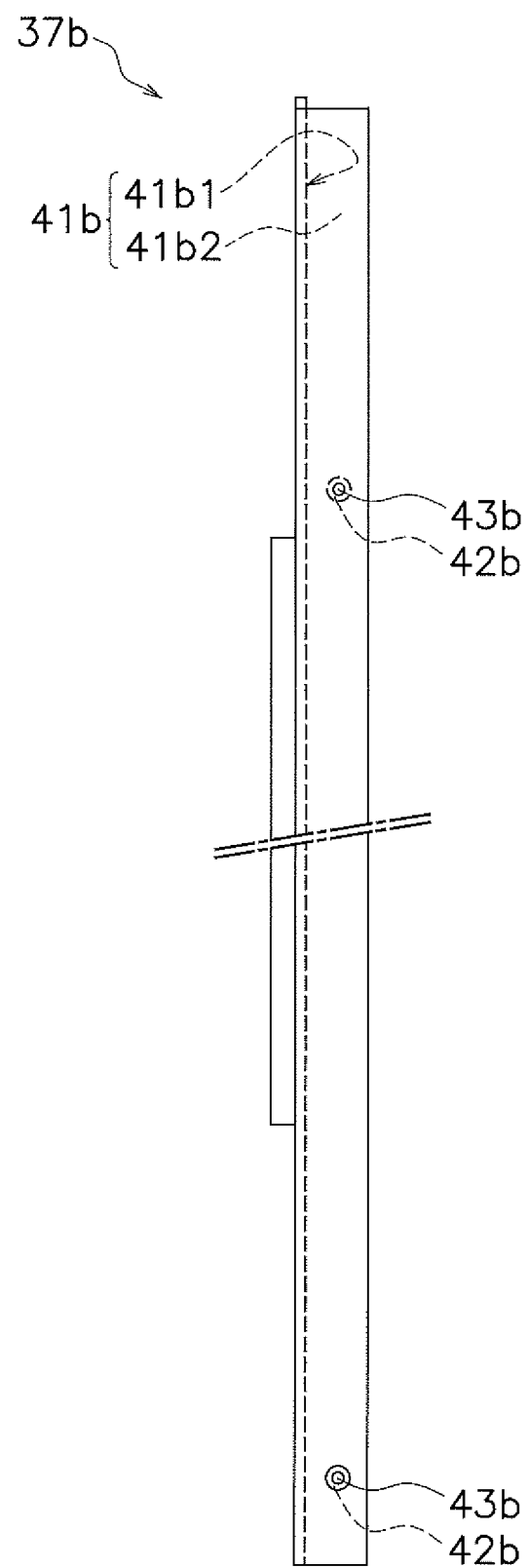
FIG. 10 illustrates the right-side tube sheet 37b when viewed in a direction denoted by arrow X in FIG. 8.
Figure 11:
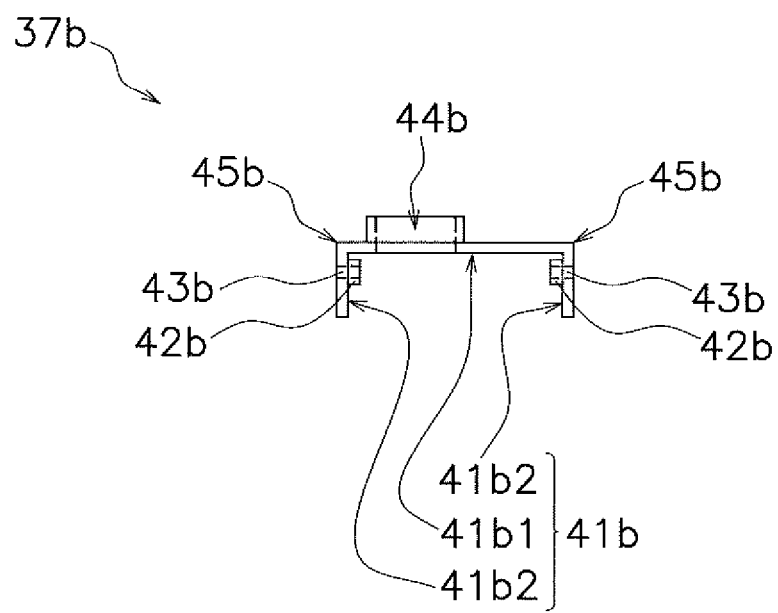
FIG. 11 illustrates the right-side tube sheet 37b when viewed in a direction denoted by arrow XI in FIG. 8.

FIG. 8 illustrates the right-side tube sheet 37b when viewed from the left side toward the right side in FIG. 2. FIG. 9 illustrates the right-side tube sheet 37b when viewed in a direction denoted by arrow IX in FIG. 8. FIG. 10 illustrates the right-side tube sheet 37b when viewed in a direction denoted by arrow X in FIG. 8. FIG. 11 illustrates the right-side tube sheet 37b when viewed in a direction denoted by arrow XI in FIG. 8. FIG. 11 corresponds to an illustration representing the right-side tube sheet 37b when viewed from the upper side toward the lower side in FIG. 2.

The right-side tube sheet 37b mainly includes a right-side bonding surface 41b, right-side rising portions 42b, right-side through-holes 43b, and right-side openings 44b. As illustrated in FIG. 11, the right-side tube sheet 37b is bent at a right angle in two right-side bent portion 45b and has a U-shape when viewed along the vertical direction. The right-side bonding surface 41b is an inner principal surface of the right-side tube sheet 37b. The right-side bonding surface 41b is an aluminum-clad surface on which a layer of an aluminum brazing material is formed. The right-side bonding surface 41b is constituted by a right-side first bonding surface 41b1 and right-side second bonding surfaces 41b2. As illustrated in FIG. 11, the right-side first bonding surface 41b1 is sandwiched between two right-side second bonding surfaces 41b2. The right-side bent portions 45b demarcate the right-side first bonding surface 41b1 and the right-side second bonding surfaces 41b2.

As illustrated in FIG. 8, the right-side first bonding surface 41b1 has many right-side openings 44b. In manufacturing of the heat exchanger 30, both the end portions of the heat transfer tubes 31 to 34 and the second bent portions 31c to 34c of the heat transfer tubes 31 to 34 are fitted to the right-side openings 44b. The aluminum brazing material on the right-side bonding surface 41b is used to braze the right-side tube sheet 37b and the heat transfer tubes 31 to 34.

As illustrated in FIGS. 9 and 10, each of the two right-side second bonding surfaces 41b2 includes the right-side rising portions 42b and the right-side through-holes 43b. The right-side rising portions 42b rise from the right-side second bonding surface 41b2. The right-side through-holes 43b are formed in the right-side second bonding surface 41b2. The right-side through-holes 43b are opened through the right-side rising portions 42b from the right-side second bonding surface 41b2. The right-side rising portions 42b correspond to barring flanges formed when the right-side through-holes 43b are bored in the right-side second bonding surface 41b2. The right-side through-holes 43b are holes through which tube-sheet fixing screws are to be passed. Layers of aluminum brazing materials are not formed inside the right-side through-holes 43b, i.e., on inner peripheral surfaces of the right-side through-holes 43b. The tube-sheet fixing screws are fixing members used to fix the right-side tube sheet 37b to the casing 10 and the partition plate 15. More specifically, the right-side through-holes 43b in one of the two right-side second bonding surfaces 41b2 are holes through which the tube-sheet fixing screws for fixing the right-side tube sheet 37b to the casing 10 are to be passed, and the right-side through-holes 43b in the other right-side second bonding surfaces 41b2 are holes through which the tube-sheet fixing screws for fixing the right-side tube sheet 37b to the partition plate 15 are to be passed.

In the following, as required, the left-side bonding surface 41a and the right-side bonding surface 41b are collectively called the bonding surfaces 41a and 41b, the left-side rising portions 42a and the right-side rising portions 42b are collectively called the rising portions 42a and 42b, and the left-side through-holes 43a and the right-side through-hole 43b are collectively called the through-holes 43a and 43b.

(3) Manufacturing Method of Heat Exchanger

First, the heat transfer tubes 31 to 34 disposed in a state of not contacting with each other, as illustrated in FIG. 3, are combined with the heat transfer fins 35. More specifically, the heat transfer fins 35 are each inserted between adjacent two of the horizontal portions 31a to 34a of the heat transfer tubes 31 to 34 as illustrated in FIG. 4.

Then, the inlet-outlet pipes 36a and 36b and the tube sheets 37a and 37b are attached to the heat transfer tubes 31 to 34. More specifically, the tube sheets 37a and 37b are attached to both the end portions of the heat transfer tubes 31 to 34 in the left-right direction. At that time, the upper-side frame panel 38a and the lower-side frame panel 38b are also attached to the tube sheets 37a and 37b. Thereafter, the inlet-outlet pipes 36a and 36b are attached to both the end portions of the heat transfer tubes 31 to 34. The inlet-outlet pipes 36a and 36b have openings to which the end portions of the heat transfer tubes 31 to 34 are fitted. Thus, a temporary assembly of the heat exchanger 30 in combination of the heat transfer tubes 31 to 34, the heat transfer fins 35, the inlet-outlet pipes 36a and 36b, and the tube sheets 37a and 37b is fabricated.

Then, the temporary assembly of the heat exchanger 30 is put into a brazing furnace, and the heat transfer fins 35, the inlet-outlet pipes 36a and 36b, and the tube sheets 37a and 37b are brazed to the heat transfer tubes 31 to 34 that correspond to a main body of the heat exchanger 30. In the brazing between the heat transfer tubes 31 to 34 and the tube sheets 37a and 37b, as described above, the aluminum brazing materials applied to the aluminum-clad bonding surfaces 41a and 41b of the tube sheets 37a and 37b are used. In the brazing between the heat transfer tubes 31 to 34 and the heat transfer fins 35 and in the brazing between the heat transfer tubes 31 to 34 and the inlet-outlet pipes 36a and 36b, aluminum brazing materials previously applied to near bonding regions are used. In the furnace brazing, the aluminum brazing materials are melted to effectuate the brazing between the heat transfer tubes 31 to 34 and the heat transfer fins 35, the brazing between the heat transfer tubes 31 to 34 and the inlet-outlet pipes 36a and 36b, and the brazing between the heat transfer tubes 31 to 34 and the tube sheets 37a and 37b. In the furnace brazing, a furnace temperature is controlled to be held at about 610° C., for example.

Then, the temporary assembly of the heat exchanger 30 after the brazing is bent into a substantially L-shape. As a result, the substantially L-shaped heat exchanger 30 illustrated in FIG. 1 is formed from the flat-plate-shaped heat exchanger 30 illustrated in FIG. 2.

(4) Features

The heat exchanger 30 according to these one or more embodiments is a microchannel heat exchanger in which heat exchange is performed between the refrigerant flowing in the through-holes 39 of the heat transfer tubes 31 to 34 in the form of flat perforated tubes and the outdoor air passing the heat transfer fins 35. As illustrated in FIG. 2, both the end portions of the heat exchanger 30 in the left-right direction are supported by the pair of tube sheets 37a and 37b. The tube sheets 37a and 37b are bonded to the heat transfer tubes 31 to 34 by brazing.

The tube sheets 37a and 37b are supported members used to fix the heat transfer tubes 31 to 34, which correspond to the main body of the heat exchanger 30, to the casing 10 and the partition plate 15 in the outdoor unit 100. The casing 10 and the partition plate 15 are supports for supporting the tube sheets 37a and 37b inside the casing 10. The tube sheets 37a and 37b include the through-holes 43a and 43b through which the tube-sheet fixing screws penetrate. The tube-sheet fixing screws are fixing members used to fix the tube sheets 37a and 37b to the casing 10 and the partition plate 15.

Figure 12:
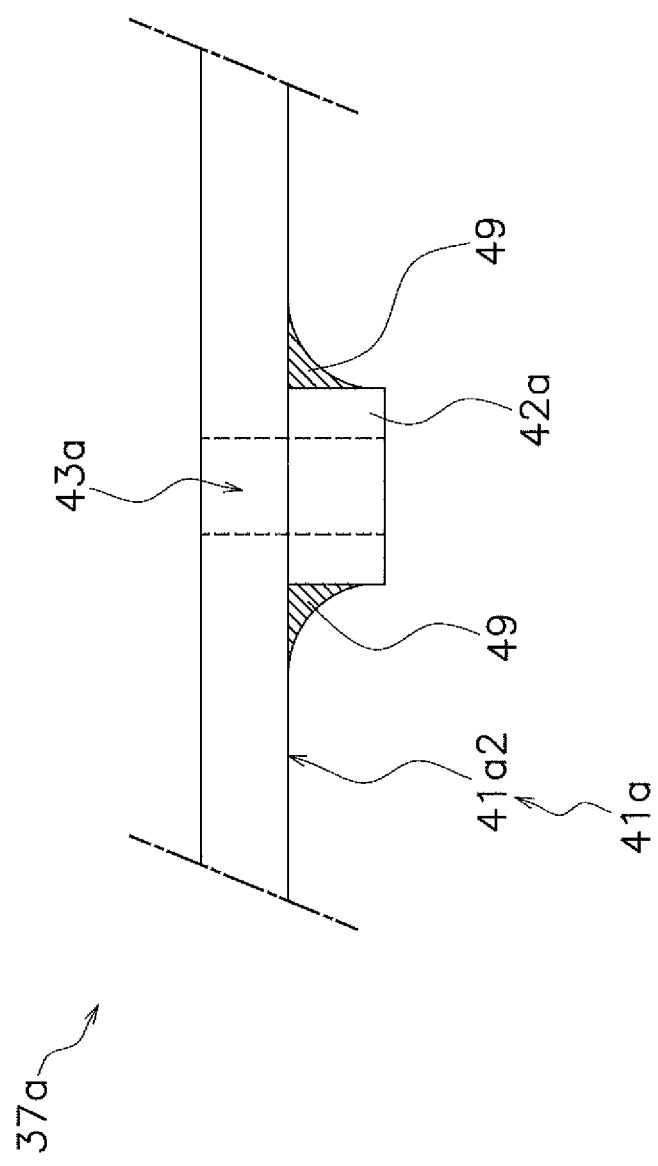
FIG. 12 illustrates, in an enlarged scale, the vicinity of a left-side rising portion 42a and a left-side through-hole 43a of the left-side tube sheet 37a according to one or more embodiments.

The tube sheets 37a and 37b include the rising portions 42a and 42b corresponding to the barring flanges of the through-holes 43a and 43b. The rising portions 42a and 42b are formed on the bonding surfaces 41a and 41b, i.e., the aluminum-clad surfaces, of the tube sheets 37a and 37b. FIG. 12 illustrates, in an enlarged scale, the vicinity of the left-side rising portion 42a and the left-side through-hole 43a of the left-side tube sheet 37a. As illustrated in FIG. 12, during the brazing, even when the aluminum brazing material on the left-side second bonding surface 41a2 of the left-side bonding surface 41a is melted and flows toward the left-side through-hole 43a, the melted aluminum brazing material is prevented from coming into the left-side through-hole 43a because the left-side rising portion 42a rising from the left-side second bonding surface 41a2 blocks the flow of the aluminum brazing material. The above point is similarly applied to the right-side tube sheet 37b.

Thus, in the heat exchanger 30, when the tube sheets 37a and 37b and the heat transfer tubes 31 to 34 are brazed to each other, the rising portions 42a and 42b prevent the melted aluminum brazing materials on the bonding surfaces 41a and 41b from coming into the through-holes 43a and 43b. If the melted aluminum brazing materials at high temperature come into the through-holes 43a and 43b, shapes of the through-holes 43a and 43b are deformed due to thermal deformation of the tube sheets 37a and 37b. Changes in the shapes of the through-holes 43a and 43b may lead to a possibility that the tube-sheet fixing screws cannot be normally inserted into the through-holes 43a and 43b, or that the tube sheets 37a and 37b cannot be normally fixed to the casing 10 and the partition plate 15 using the tube-sheet fixing screws. In contrast, in the heat exchanger 30, because the rising portions 42a and 42b are formed on the bonding surfaces 41a and 41b of the tube sheets 37a and 37b, deformations of the through-holes 43a and 43b, which may be caused by the melted aluminum brazing materials at high temperature coming into the through-holes 43a and 43b, are suppressed when the tube sheets 37a and 37b and the heat transfer tubes 31 to 34 are brazed to each other.

Furthermore, as illustrated in FIG. 12, during the brazing, fillets 49 of the melted brazing materials are formed around the rising portions 42a and 42b due to surface tension of the melted brazing materials. In FIG. 12, the fillets 49 are denoted as hatched regions. The fillets 49 are pools of the melted brazing materials, which are formed at boundary corners between outer peripheral surfaces of the rising portions 42a and 42b and the bonding surface 41a and 41b. The fillets 49 solidified after the brazing provide the effect of mechanically reinforcing the rising portions 42a and 42b. As a result, the fillets 49 increase the strength of the rising portions 42a and 42b, and suppress the through-holes 43a and 43b from being deformed due to forces applied from the outside.

Thus, since the deformations of the through-holes 43a and 43b through which the tube-sheet fixing screws for fixing the tube sheets 37a and 37b are to be passed are suppressed, it is possible to suppress the occurrence of a trouble that the tube-sheet fixing screws are loosened inside the outdoor unit 100 due to, for example, vibrations of the compressor 20, and that the heat exchanger 30 is no longer normally fixed to the casing 10 and the partition plate 15. Hence the heat exchanger 30 can suppress occurrence of a trouble that the heat transfer tubes 31 to 34 cannot be normally fixed.

Moreover, in the heat exchanger 30, the tube sheets 37*a* and 37*b* are each formed of an aluminum-clad member having the layer of the aluminum brazing material. Accordingly, in a step of brazing the tube sheets 37*a* and 37*b* and the heat transfer tubes 31 to 34 to each other, aluminum brazing materials are not needed to be applied to bonding regions, and the brazing between the tube sheets 37*a* and 37*b* and the heat transfer tubes 31 to 34 is facilitated.

In the heat exchanger 30, the brazing between the tube sheets 37*a* and 37*b* and the heat transfer tubes 31 to 34 is performed by a furnace brazing process. Therefore, the tube sheets 37*a* and 37*b* and the heat transfer tubes 31 to 34 can be efficiently brazed to each other.

In the heat exchanger 30, the tube sheets 37*a* and 37*b* are brazed to the heat transfer tubes 31 to 34. Therefore, the tube sheets 37*a* and 37*b* can be easily bonded to the main body of the heat exchanger 30.

In the heat exchanger 30, the left-side tube sheet 37*a* is the L-shaped plate-like member as illustrated in FIG. 7, and the right-side tube sheet 37*b* is the U-shaped plate-like member as illustrated in FIG. 11. Therefore, workability of the left-side tube sheet 37*a* and the right-side tube sheet 37*b* can be improved.

(5) Modifications

Practical constitutions of the present invention can be modified within the scope not departing from the gist of the present invention. Modifications capable of being derived from the embodiments of the present invention will be described below.

(5-1) Modification A

In the heat exchanger 30 according to the one or more embodiments, the tube sheets 37*a* and 37*b* are fixed to both of the casing 10 and the partition plate 15 using the tube-sheet fixing screws. However, the tube sheets 37*a* and 37*b* may be fixed to only one of the casing 10 and the partition plate 15 using the tube-sheet fixing screws.

(5-2) Modification B

In the heat exchanger 30 according to the one or more embodiments, the tube sheets 37*a* and 37*b* are fixed to the casing 10 and the partition plate 15 using the tube-sheet fixing screws. However, the tube sheets 37*a* and 37*b* may be fixed to the casing 10 and the partition plate 15 using other fixing members than the tube-sheet fixing screws. In an alternative example, the tube sheets 37*a* and 37*b* may be fixed to the casing 10 and the partition plate 15 using bolts and nuts.

(5-3) Modification C

In the heat exchanger 30 according to the one or more embodiments, the heat transfer tubes 31 to 34 are fixed to the casing 10 and the partition plate 15 using the tube sheets 37*a* and 37*b*. However, the heat transfer tubes 31 to 34 may be fixed to the casing 10 and the partition plate 15 using other members than the tube sheets 37*a* and 37*b*. In alternative examples, the heat transfer tubes 31 to 34 may be fixed to the casing 10 and the partition plate 15 using brackets instead of the tube sheets 37*a* and 37*b*.

Figure 13:
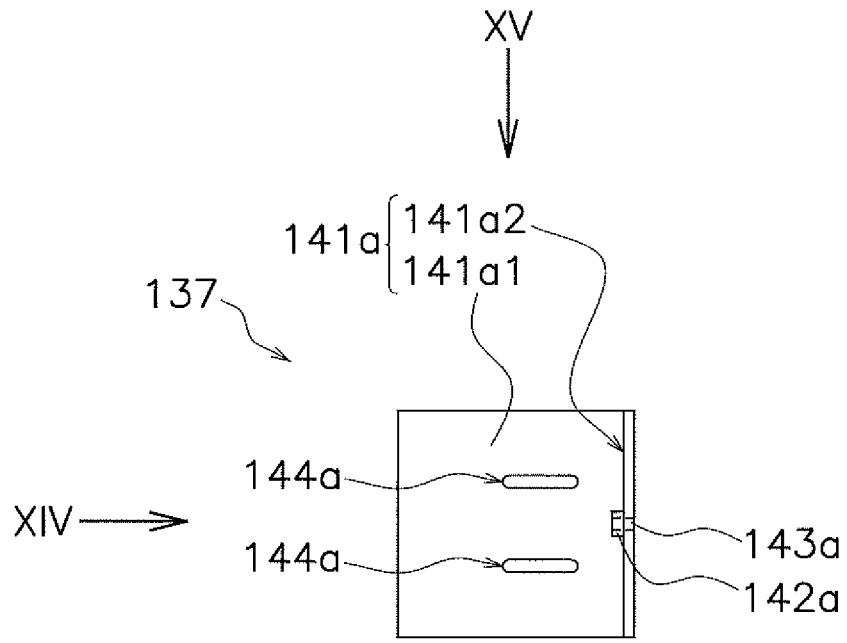
FIG. 13 illustrates a bracket 137 in Modification C according to one or more embodiments.
Figure 14:
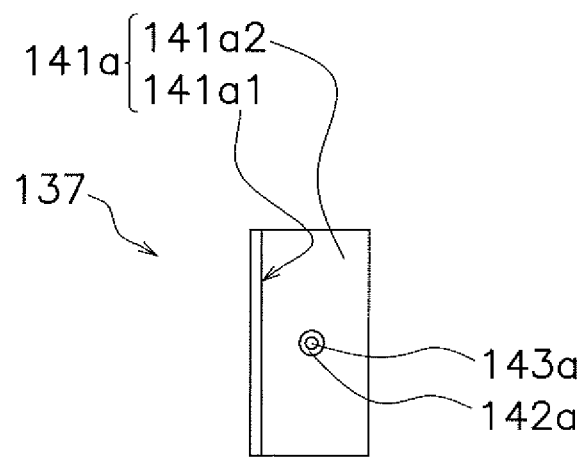
FIG. 14 illustrates the bracket 137 when viewed in a direction denoted by arrow XIV in FIG. 13.
Figure 15:
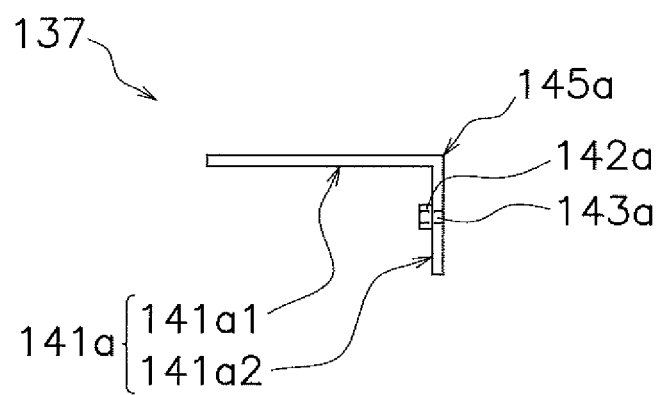
FIG. 15 illustrates the bracket 137 when viewed in a direction denoted by arrow XV in FIG. 13.

Examples of the bracket 137 for fixing the heat transfer tubes 31 to 34 to the casing 10 and the partition plate 15 will be described below. Like the tube sheets 37*a* and 37*b*, the bracket 137 is a member that is brazed to the heat transfer tubes 31 to 34, and that is fixed to the casing 10 and the partition plate 15 using the tube-sheet fixing screw. FIG. 13 illustrates the bracket 137. FIG. 14 illustrates the bracket 137 when viewed in a direction denoted by arrow XIV in FIG. 13. FIG. 15 illustrates the bracket 137 when viewed in a direction denoted by arrow XV in FIG. 13.

The bracket 137 mainly includes a bonding surface 141*a*, a rising portion 142*a*, a through-holes 143*a*, and openings 144*a*. As illustrated in FIG. 15, the bracket 137 is bent at a right angle in one bent portion 145*a* and has an L-shape when viewed along the vertical direction. The bonding surface 141*a* is an inner principal surface of the bracket 137. The bonding surface 141*a* is an aluminum-clad surface on which a layer of an aluminum brazing material is formed. The bonding surface 141*a* is constituted by a first bonding surface 141*a*1 and a second bonding surface 141*a*2. The bent portions 145*a* demarcates the first bonding surface 141*a*1 and the second bonding surface 141*a*2.

As illustrated in FIG. 13, the first bonding surface 141*a*1 has two openings 144*a*. In manufacturing of the heat exchanger 30, the end portions of the heat transfer tubes 31 to 34 are inserted through the openings 144*a*. The aluminum brazing material on the bonding surface 141*a* is used to braze the bracket 137 and the heat transfer tubes 31 to 34.

As illustrated in FIG. 14, the second bonding surface 141*a*2 includes the rising portion 142*a* and the through-hole 143*a*. The rising portion 142*a* rises from the second bonding surface 141*a*2. The through-hole 143*a* is formed in the second bonding surface 141*a*2. The through-hole 143*a* is opened through the rising portion 142*a* from the second bonding surface 141*a*2. The rising portion 142*a* corresponds to a barring flange formed when the through-hole 143*a* is bored in the second bonding surface 141*a*2. The through-hole 143*a* is a hole through which a tube-sheet fixing screw is to be passed. A layer of an aluminum brazing material is not formed inside the through-holes 143*a*, i.e., on an inner peripheral surface of the through-hole 143*a*. The tube-sheet fixing screw is a fixing member used to fix the bracket 137 to the casing 10 or the partition plate 15.

The bracket 137 is attached, for example, between the right-side tube sheet 37*b* and each of the inlet-outlet pipes 36*a* and 36*b* in FIG. 2. In this case, in a process of manufacturing the heat exchanger 30, after attaching the right-side tube sheet 37*b*, the end portions of part of the heat transfer tubes 31 to 34 are inserted through the openings 144*a* of the bracket 137, whereby the bracket 137 is attached in place. Then, the bracket 137 and the heat transfer tubes 31 to 34 are brazed to each other by furnace brazing. Also in this modification, the heat exchanger 30 is fixed to the casing 10 and the partition plate 15 using the tube-sheet fixing screws that are inserted through the through-holes 143*a* of the brackets 137.

Alternatively, the bracket 137 may include, instead of the openings 144*a*, cutouts through which the horizontal portions 31*a* to 34*a* of the heat transfer tubes 31 to 34 are inserted, or opening through which the first bent portions 31*b* to 34*b* and the second bent portions 31*c* to 34*c* of the heat transfer tubes 31 to 34 are inserted.

(5-4) Modification D

The heat exchanger 30 according to the embodiment is used as an outdoor heat exchanger that is a component of the outdoor unit 100 for the air conditioner. However, the heat exchanger 30 may be used as an indoor heat exchanger that is a component of an indoor unit for the air conditioner, or as a heat exchanger used in another type refrigeration apparatus.

(5-5) Modification E

In the embodiment, as illustrated in FIG. 7, the left-side second bonding surface 41*a*2 of the left-side tube sheet 37*a* includes the left-side rising portions 42*a*. The left-side rising portions 42*a* correspond to the barring flanges formed when the left-side through-holes 43a are bored in the left-side tube sheet 37a from the opposite side to the left-side second bonding surface 41a2. Each of the left-side rising portions 42a may have various shapes depending on a method of forming the left-side through-hole 43a, a diameter of the left-side through-hole 43a, a thickness of the left-side tube sheet 37a, etc. The above point is similarly applied to the right-side rising portions 42b of the right-side tube sheet 37b illustrated in FIG. 11.

Figure 16A:
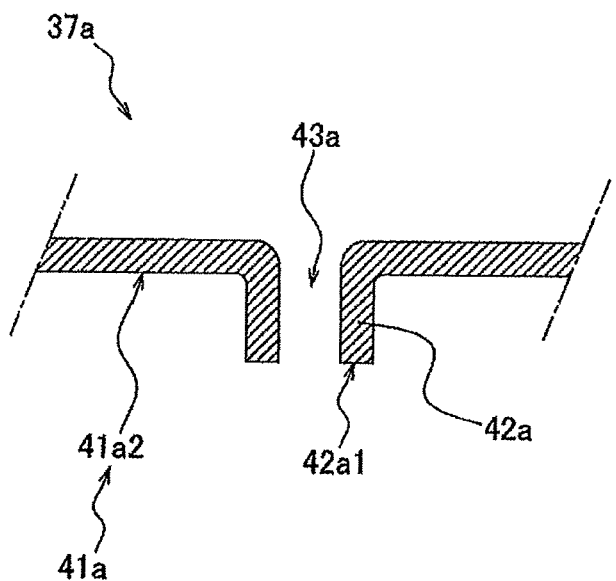
FIGS. 16A and 16B are each an example of a sectional view illustrating the vicinity of the left-side rising portion 42a when sectioned at a position where the left-side through-hole 43a passes.
Figure 16B:
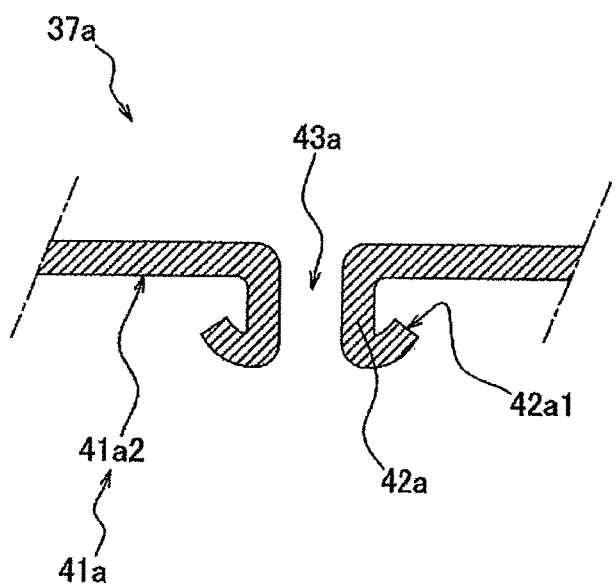

FIGS. 16(a) and 16(b) are each an example of a sectional view illustrating the vicinity of the left-side rising portion 42a when sectioned at a position where the left-side through-hole 43a passes. In FIG. 16(a), an end surface 42a1 of the left-side rising portion 42a is present at a position farthest away from the left-side second bonding surface 41a2. In this case, the left-side through-hole 43a is opened at the end surface of the left-side rising portion 42a. On the other hand, in FIG. 16(b), an end portion of the left-side rising portion 42a is bent to be folded toward the left-side second bonding surface 41a2. Thus, the end surface 42a1 of the left-side rising portion 42a is not present at the position farthest away from the left-side second bonding surface 41a2. In FIGS. 16(a) and 16(b), since the left-side through-hole 43a is bored from a surface where the layer of the aluminum brazing material is not formed, i.e., the surface on the opposite side to the left-side second bonding surface 41a2, the layer of the aluminum brazing material is not applied to or formed on the inner peripheral surface of the left-side through-hole 43a. The above description is similarly applied to the right-side rising portion 42b.

INDUSTRIAL APPLICABILITY

The heat exchanger according to one or more embodiments of the present invention and the outdoor unit for the refrigeration apparatus including the heat exchanger can suppress the occurrence of the trouble that the main body of the heat exchanger cannot be normally fixed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 10 casing (support)
10a heat exchanger chamber
10b machine chamber
15 partition plate (support)
20 compressor
30 heat exchanger
31 to 34 heat transfer tube
37a left-side tube sheet (supported member)
37b right-side tube sheet (supported member)
41a left-side bonding surface (bonding surface)
41a1 left-side first bonding surface (first bonding surface)
41a2 left-side second bonding surface (second bonding surface)
41b right-side bonding surface (bonding surface)
41b1 right-side first bonding surface (first bonding surface)
41b2 right-side second bonding surface (second bonding surface)
42a left-side rising portion (rising portion)
42b right-side rising portion (rising portion)
43a left-side through-hole (through-hole)
43b right-side through-hole (through-hole)
45a left-side bent portion (bent portion)
45b right-side bent portion (bent portion)
100 outdoor unit

CITATION LIST

Patent Literature

[PTL 1] Japanese Unexamined Patent Application Publication No. 2010-107103

The invention claimed is:

1. A heat exchanger comprising:
a main body that comprises heat transfer tubes through which refrigerant flows; and
a tube sheet that is bonded to the main body by brazing the tube sheet to surfaces of the heat transfer tubes with a brazing material and that fixes the main body to a support by a fastener, wherein
the tube sheet comprises:
a bonding surface to which the brazing material is applied;
a bent portion that demarcates the bonding surface into a first bonding area and a second bonding area, wherein
the second bonding area has an integrally formed rising portion that rises from the second bonding area; and
a through-hole through which the fastener is passed,
the through-hole is opened at the rising portion, penetrates the tube sheet, and has an inner peripheral surface to which the brazing material is not applied,
the tube sheet is bonded at the first bonding area to the main body, and
the rising portion is disposed only on a first side of the second bonding area of the tube sheet.

2. The heat exchanger according to claim 1, wherein the brazing material is formed as a layer of that brazes aluminum.

3. The heat exchanger according to claim 1, wherein the tube sheet is bonded to the main body by furnace brazing.

4. An outdoor unit of a refrigeration apparatus, comprising:
the heat exchanger according to claim 1;
a compressor; and
a support to which the heat exchanger and the compressor are fixed, wherein
the support is at least one of a casing and a partition plate,
the casing stores the heat exchanger and the compressor, and
the partition plate partitions an inner space of the casing into a heat exchanger chamber in which the heat exchanger is disposed, and a machine chamber in which the compressor is disposed.

5. The heat exchanger according to claim 1, wherein an end of the rising portion extends toward the second bonding area.

* * * * *